United States Patent [19]

Schwoyer et al.

[11] Patent Number: 4,765,900
[45] Date of Patent: Aug. 23, 1988

[54] PROCESS FOR THE TREATMENT OF WASTE

[75] Inventors: William L. Schwoyer, Boulder; Larry S. Jaycox, Lakewood; Hermann W. Peterscheck, Longmont, all of Colo.

[73] Assignee: VerTech Treatment Systems, Inc., Denver, Colo.

[21] Appl. No.: 14,330

[22] Filed: Feb. 13, 1987

[51] Int. Cl.$^4$ ............................................. C02F 1/72
[52] U.S. Cl. ................................. 210/603; 210/631; 210/711; 210/716; 210/761; 210/805
[58] Field of Search ................ 210/603, 607, 630, 631, 210/761, 711, 714–716, 638, 639, 747, 805, 806

[56] References Cited

U.S. PATENT DOCUMENTS

| | | | |
|---|---|---|---|
| 3,920,548 | 11/1975 | Fassell et al. | 210/761 |
| 3,930,998 | 1/1976 | Knopp et al. | 210/631 X |
| 3,932,275 | 1/1976 | Mewes et al. | 210/714 X |
| 3,961,078 | 6/1976 | Stitt | 210/631 X |
| 4,040,953 | 8/1977 | Ort | 210/631 X |
| 4,053,394 | 10/1977 | Fisk | 210/631 X |
| 4,076,620 | 2/1978 | Opforkuch, Jr. et al. | 210/711 |
| 4,272,383 | 6/1981 | McGrew | 210/761 X |
| 4,519,921 | 5/1985 | Russ et al. | 210/716 |

*Primary Examiner*—Tom Wyse
*Attorney, Agent, or Firm*—Cullen, Sloman, Cantor, Grauer, Scott & Rutherford

[57] ABSTRACT

A method of treating organic waste is provided which includes separating the liquid portion of the waste from the solid portion prior to reacting said solid portion in an accelerated wet oxidation reaction. The method includes using an internally-derived ash from the wet oxidation reaction to weight the organic waste, thereby increasing the rate at which the liquid phase can be separated from the solid phase. By first removing the liquid portion of the waste, the oxygen demand of the waste to be processed by wet oxidation is substantially lowered. Ammonia is removed from the liquid portion of the waste in a de-ammoniating step which is followed by biological decomposition to form a liquid stream having a greatly reduced oxygen demand. In one embodiment, the method includes further treating the liquid stream to substantially remove salts and using the resulting deionized stream as a diluent to dilute the solid portion of the waste prior to wet oxidation. The present invention also provides a method of treating organic waste which includes reacting said waste in accelerated wet oxidation reaction apparatus to produce a low-volume sterile ash, a liquid effluent portion and a mixture of reaction off gases. The liquid effluent portion is de-ammoniated then decomposed biologically to form a liquid stream having a greatly reduced oxygen demand. The liquid stream is then desalinated and used as a diluent to dilute the organic waste prior to its introduction into the wet oxidation reaction apparatus.

19 Claims, 2 Drawing Sheets

PROCESS FOR THE TREATMENT OF WASTE

FIELD OF INVENTION

The present invention relates generally to methods for treating organic waste and wastewater. More specifically the present invention relates to integrated processes which utilize physical, biological and chemical operations for the treatment of animal waste.

BACKGROUND OF THE INVENTION

It is estimated that in the United States alone, over 1.5 billion tons of animal waste are produced annually. While a portion of this waste is generated on farms where disposal may consist of on-site manure spreading, large amounts are also produced in feedlots, many of which are located near urban areas. For a number of reasons, manure spreading, incineration and other traditional waste disposal alternatives may be undesirable or impractical. Hence, economical animal waste processing methods which produce environmentally desirable products are needed.

Modern animal feedstuffs are complex mixtures of protein, fiber, vitamins, minerals, salts and other components, balanced to provide optimum nutrition at minimum cost. Sodium, calcium, phosphorous, magnesium, potassium, and other minerals are present in most feedstuffs. In addition, large amounts of chlorides are ingested by livestock, often from salt-blocks and the like. The ingestion of salt is known to increase the thirst and appetite of animals which increases body weight. Although nutrient-enriched diets are designed to produce healthier, more marketable likestock, the high concentrations of chlorides, ammonia, and minerals which these highly nutritious feedstuffs produce in animal waste are of particular concern in waste processing systems.

Generally, livestock waste contains from about 8 percent to about 11 percent by weight carbonaceous material, although concentrations outside this range are not uncommon, depending on the amount of washdown water present. Unprocessed or raw animal wastes typically have a chemical oxygen demand (COD) of from about 80,000 mg/l to about 120,000 mg/l. The chemical oxygen demand is a measure of the quantity of chemically oxidizable components present in the waste. Animal wastes also generally have a biochemical oxygen demand (BOD) of from about 40,000 gm/l to about 90,000 mg/l. The biochemical oxygen demand is the quantity of oxygen required during decomposition of the organic waste matter by aerobic biochemical action. The BOD is usually determined by measuring oxygen consumption of decay microorganisms in a waste sample during a five-day period at 20° C. As will be appreciated by those skilled in the art, one important objective of waste treatment processing is the reduction of the oxygen demand of the waste effluent. Oxygen depletion or deoxygenation of receiving waters due to the discharge of waste effluents having high oxygen demands is a significant environmental concern and is the subject of considerable governmental regulation.

Waste processing systems are designed to provide the most environmentally compatible waste effluent at the lowest cost, with maximum utilization of process by-products. Thus, processing schemes which require a relatively low initial capital expenditure and which have low operational and maintenance costs are highly desirable. Those conventional waste processing systems which are adaptable to processing animal wastes lack efficient, comprehensive methods for substantially reducing the oxygen demand of the wastes while also removing harmful chlorides and the like which cause corrosion of the waste processing equipment. Further, conventional processes do not adequately inhibit the formation or transfer of environmentally undesirable products. The present invention provides an integrated waste treatment system particularly suited for the processing of animal wastes which solves many of the problems associated with conventional waste processing systems.

SUMMARY OF THE INVENTION

In accordance with the present invention, there is provided a total, integrated system for processing waste, which is particularly suitable for processing animal waste. In one embodiment, the method includes adding an internally-derived ash as a weighting agent to animal waste, then dewatering the weighted waste to form a liquid stream which may contain as much as half of the biochemical oxygen demand of the initial waste. This liquid stream also contains a substantial portion of the chlorides and ammonia present in the waste. The liquid stream is then de-ammoniated, preferably by ammonia stripping, and the resulting ammonia compounds are reclaimed for use as fertilizer or the like. The de-ammoniated liquid stream is flowed directly to a biological polishing unit where suspended solids and dissolved organic matter are decomposed efficiently. The preferred biological processing step is anaerobic polishing in which carbonaceous material is converted to methane and other gases which can then be used as fuel, preferably on-site. The biological sludge or biomass produced during biological polishing is recombined with the dewatered waste which undergoes thermal treatment (aerobic or anaerobic). Preferably, anions such as phosphate, sulfate, carbonate and oxalate ions are removed from the liquid stream during the de-ammoniating process. By adding calcium hydroxide or another suitable precipitant to the liquid stream in the present invention, these anions are precipitated out of solution. Simultaneously, the addition of calcium hydroxide raises the pH of the liquid stream so that ammonia can be removed in an ammonia stripper. The precipitates are separated from the stream and added to the ash derived from thermal treatment of the carbonaceous solids, and then dewatered for disposal or recovery.

The present invention also contemplates the use of internally-derived gaseous carbon dioxide to carbonate the liquid stream following the anion removal/ammonia stripping step. This is achieved in one aspect by bubbling biogas generated during biological polishing or during a subsequent wet oxidation stage through the de-ammoniated liquid stream to precipitate scale-forming cations such as calcium and magnesium which may otherwise form scale on the reaction apparatus during subsequent waste treatment. The resulting carbonate precipitates are then added to the ash to be dewatered and undergo disposal as described herein.

The liquid effluent stream, after biological polishing, is then preferably further treated by aerobic polishing, evaporation/condensation or most preferably by ultrafiltration and reverse osmosis. The substantially deionized liquid stream is then preferably used as a feed diluent for diluting the dewatered waste which also contains the aforementioned ash and biomass. Alternatively, externally-derived, low-chloride water may be used as the feed diluent. The diluted liquid waste is then flowed into a wet oxidation reaction apparatus where the waste is heated and mixed with oxygen as it is substantially, completely oxidized in an accelerated wet oxidation reaction. The exothermic wet oxidation reaction takes place at about 420°-600° F., preferably between 530° and 550° F. The heat generated by the reaction may be recovered as steam of 150-1000 psig, preferably 300-600 psig, to be used along with the aforementioned internally-derived methane to generate electricity, superheated steam or hot water. The influent liquid may also be preheated as may be required. The effluent from the wet oxidation reaction is then processed in gas/liquid and liquid/solids separating equipment which preferably includes the steps of clarification, thickening and dewatering. A portion of the resulting low-volume, sterile ash is used as the weighting agent which is combined with the waste during the initial waste dewatering process. The remaining ash may be reused as an animal food supplement or soil conditioner. The liquid stream from the wet oxidation reaction effluent is flowed to the biological polishing unit to be processed along with the de-ammoniated liquid stream.

By first separating the soluble COD from the waste before the dewatered waste is oxidized through wet oxidation, a greater concentration of waste can be processed in the wet oxidation apparatus. Further, removing the highly ammoniated liquid from the waste before the waste is oxidized through wet oxidation facilitates removal of ammonia to levels that do not inhibit biological polishing and reduces the production of undesirable nitrates. By using the internally-driven ash from the wet oxidation reaction as a weighting agent which is added to the waste for the initial dewatering, the sedimentation rate of the waste is enhanced considerably. Also, since the ash derived from the wet oxidation reaction generally retains some COD, by using it as a weighting agent which then passes once again through the wet oxidation reaction apparatus, this remaining COD is further reduced.

In another embodiment, live stock or other organic waste is diluted and fed directly into a wet oxidation reaction apparatus along with a source of oxygen. At an elevated temperature and under pressure, the waste is oxidized through a wet oxidation reaction whereby the chemical oxygen demand of the waste is substantially reduced. The reaction products or effluent are then dewatered and the liquid portion so produced is processed by the method previously described which includes de-ammoniating the liquid portion, precipitating out scale-forming ions, polishing the liquid portion in a biological unit and, optionally, treating the liquid portion by ultrafiltration and reverse osmosis. This treatment substantially eliminates any remaining COD. The substantially deionized liquid stream is then preferably used as a feed diluent for the waste which is flowed into the wet oxidation reaction apparatus.

DESCRIPTION OF THE PREFERRED EMBODIMENTS

Figure 1:
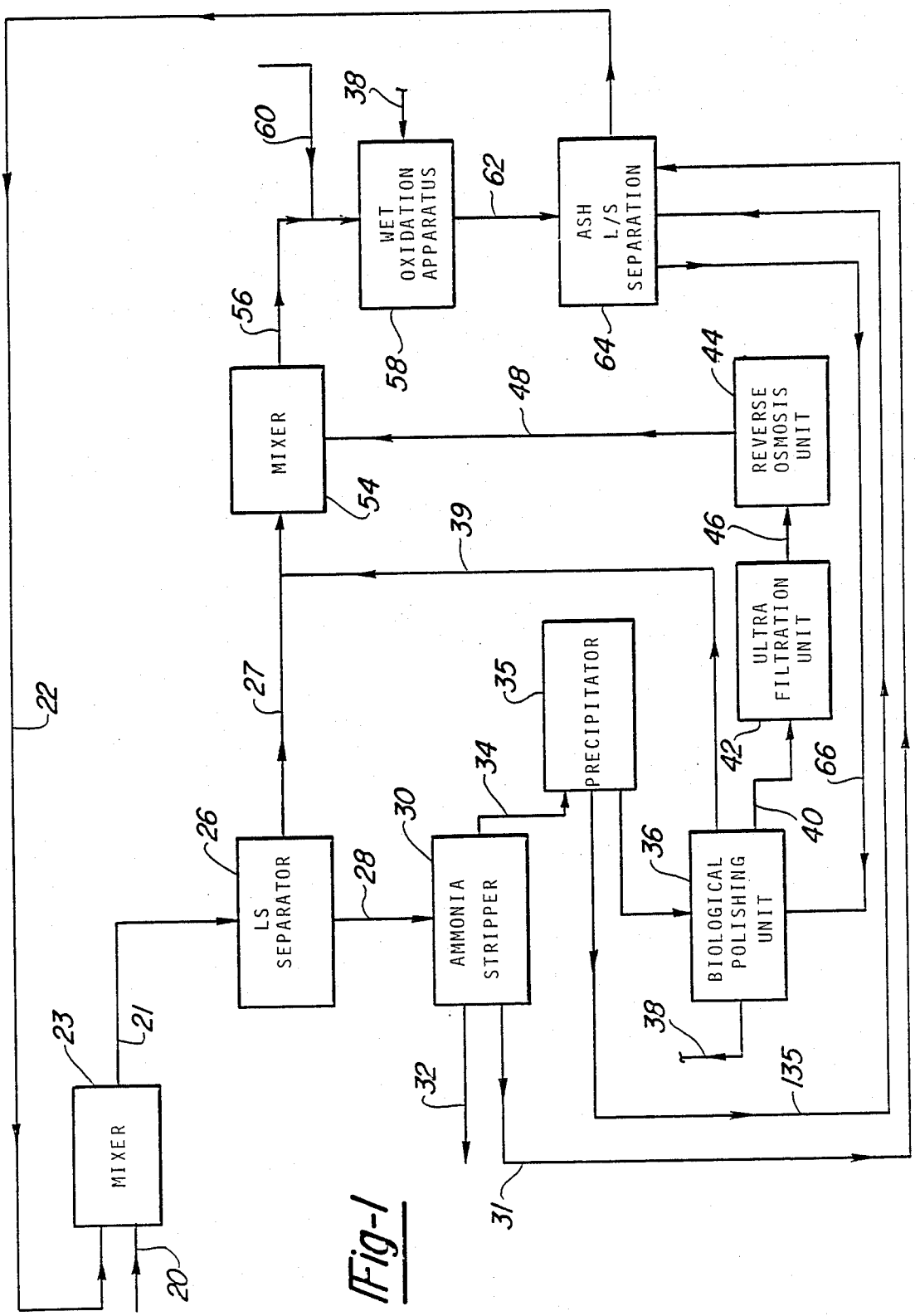
FIG. 1 is a block diagram of the method of the present invention.

Referring now to FIG. 1, the waste 20 to be processed, preferably animal waste such as swine manure is combined with an internally-derived ash 22 at mixer 23, and the mixture 21 is dewatered by liquid/solids separation 26. The ash acts as a weighting agent or body feed to enhance the sedimentation of the raw waste during liquid/solids separation. Other benefits of the present invention may be realized without the addition of a weighting agent although it is preferred that a weighting agent be used. Raw waste does not settle rapidly. By combining it with ash, a heavier mass is created which settles more quickly, thus facilitating separation. It is believed particles of ash serve as nuclei for the formation of flocculent solids which then settle more rapidly. By using an internally-derived ash, no additional solids are added to the system. Ash 22 is preferably mixed with waste 20 to evenly distribute it in waste 20. Other advantages of using this internally-derived ash 22 as a weighting agent will be described more fully hereinafter. The weighted waste mixture 21 is suitably dewatered by centrifugation, vacuum filtration, belt filtration or simply by allowing the weighted waste to settle in response to gravity. Other waste dewatering techniques including the use of a coagulant aid may be suitable or desirable in a particular application.

Dewatering produces liquid stream 28 and dewatered waste 27. Liquid stream 28 may contain up to 50 percent of the chemical oxygen demand of the initial waste 20. Typical animal waste may have a COD of from about 80,000 mg/l to about 120,000 mg/l. Liquid stream 28 contains the dissolved COD which may be from about 30,000 mg/l to about 60,000 mg/l. In addition, liquid stream 28 may contain most of the phosphorous compounds (70-400 mg/l) which were present in the initial waste, from bout 3,000 to about 6,000 mg/l of ammonia compounds and considerable quantities of soluble salts including chlorides. Liquid stream 28 is then de-ammoniated, preferably by an ammonia-stripping procedure 30 which may include raising the pH of the liquid stream to drive off the ammonia in the form of a vapor. This vapor can then be condensed as ammonium hydroxide which is preferably reclaimed for use as a fertilizer 32. It may be possible to de-ammoniate liquid stream 28 using a biological reactor; however, conventional microbes will generally not tolerate the high concentration of ammonia present in the liquid stream and, thus, substantial dilution of liquid stream 28 would be required. The ammonia vapors can be readily collected using a scrubbing stream, although other methods may be acceptable. While substantially all of the ammonia is removed from liquid stream 28, a sufficient quantity is left to act as a nutrient for subsequent biological processing.

It is most preferred that precipitate-forming anions such as phosphate, sulfate, carbonate and oxalate ions be removed from liquid stream 28 during the de-ammoniating process. This is achieved by adding calcium hydroxide or another suitable precipitant to the liquid stream 28 to raise the pH, thereby vaporizing the ammonia, and to precipitate these ions out of solution. The precipitates 31 are then directed to ash liquid/solids separator 64 where they are dewatered with the weighted ash. Following ammonia stripping/anion removal, liquid stream 34 is preferably treated to remove potentially scale-forming cations such as a calcium and magnesium ions.

By precipitating these cations with a precipitant which forms relatively insoluble precipitates, the potential to form scale during subsequent wet oxidation is eliminated. In the present invention, these cations are removed by combining liquid stream 34 with carbon dioxide in precipitator 35 to form carbonate precipitates 135 which are then directed to ash liquid/solids separator 64 to be dewatered. The $CO_2$ used in this step is preferably derived as biogas 38 from biological polishing unit 36 during a subsequent step.

The de-ammoniated liquid stream 34, which is substantially deionized and which contains enough phosphorous to meet biological nutrient requirements, is then flowed to a biological polishing unit 36 where suspended and dissolved carbonaceous matter, remaining sulfates and nitrates are substantially decomposed by microbes, preferably anaerobic microorganisms such as anaerobic bacteria. Although aerobic microbes could be used, this alternative would require that oxygen be supplied to biological polishing unit 36 and, more importantly, that liquid stream 34 be substantially diluted. This is due to the fact that aerobic microbes cannot tolerate high COD concentrations at reasonable hydraulic retention times. During anaerobic polishing, biogas 38 is evolved, principally comprising methane and carbon dioxide. Smaller amounts of carbon monoxide and hydrogen sulfide may also be generated. Biogas 38 is preferably recovered, and in some applications it may be practical to separate the constituent gases. Biogas 38 is preferably used on-site to generate heat.

While liquid stream 34 may have a COD as high as 60,000 mg/l, after processing in anaerobic polishing unit 36, the resulting liquid stream 40 has a COD of about 1,000 to 2,000 mg/l. There is also produced a biomass or biological sludge 39 during biological polishing consisting of microbes which may represent from about 0.1 to about 2.0 percent by weight of the COD of liquid stream 34 where the polishing is carried out by anaerobic microbes. The percentage of biomass 39 is much greater when aerobic microbes are used in aerobic polishing. Biomass 39 is recombined with the initial dewatered waste 27 which undergoes further processing as will be explained herein.

Figure 2:
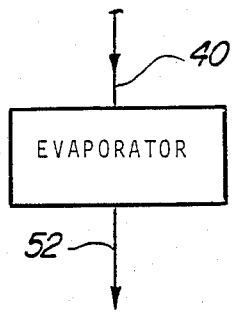
FIG. 2 is a block diagram of a portion of the present invention illustrating an alternative processing step.

Depending upon how stringent the effluent criteria are in a particular setting, liquid stream 40 may then be treated by aerobic polishing (not shown), provided the prior biological polishing step consisted of anaerobic polishing. This further reduces the COD in many instances to as low as 20 to 30 mg/l. Alternatively, and preferably for use in the present invention, liquid stream 40 receives further total solids removal. The preferred filtration process includes ultrafiltration 42, followed by reverse osmosis unit 44. If necessary, coagulation and media filtration (not shown) may precede ultrafiltration. Both techniques are membrane filtration processes. Ultrafiltration is a "large screen" process which removes particulate matter having a diameter greater than about 0.45 micrometer. After the particulate matter has been removed by filtration unit 42, liquid stream 46 is flowed to a reverse osmosis unit 44 where substantially all of the dissolved salts, including chlorides, are removed. After ultrafiltration 42 and reverse osmosis 44, liquid stream 48 is substantially pure, deionized water. In a modification of the present invention shown in FIG. 2, ultrafiltration 42 and reverse osmosis treatment 44 are replaced by an evaporation step 50 in which water is driven off to be condensed into a fluild stream 52, leaving any salts and very fine particulate matter behind in the form of a brine or cake. Evaporation 50 is not necessarily preferred for use herein, however, because volatile organics may be evaporated with the water during condensation, causing contamination. It is important to note that either ultrafiltration 42 and reverse osmosis 44, or evaporation 50 produces a liquid stream which is substantially free of chlorides, magnesium, calcium, and other such substances which are generally considered corrosive when brought in contact with metal surfaces. The deionized or demineralized liquid stream 48 is then discharged or reused, preferably as a feed diluent to dilute the initial dewatered waste 27 at mixer 54 to form diluted waste 56. An external source of low-chloride water could be used as the feed diluent.

If total desalination of the discharge stream is not required, split stream treatment may be employed to meet the desired effluent dissolved solids content. In split stream treatment, only part of the biological polishing unit effluent 40 is desalinated by membrane filtration or evaporation. The desalinated stream is then recombined with that portion of the stream which is not desalinated by membrane or evaporation resulting in a net reduction of dissolved solids.

The diluted waste 56 is then preferably treated by wet oxidation in wet oxidation reaction apparatus 58. It is to be understood that one of the important advantages of the present invention is the substantial reduction of the oxygen demand of the waste by first separating and then diverting the liquid portion containing the dissolved oxygen demand through the aforementioned treatment steps. By removing the dissolved COD from the waste before it is subjected to an accelerated wet oxidation reaction, several benefits are achieved. A greater concentration of wastes can be flowed into the oxidation unit since the waste has a substantially reduced COD. This allows for better utilization of the wet oxidation reaction apparatus to convert the solid COD to liquid which is more rapidly digested by the biological polishing unit. Also, by first separating the liquid stream from the waste, corrosion of the wet oxidation reaction apparatus is substantially reduced by virtue of the reduced chloride content.

Particularly with animal waste, during wet oxidation, substantial corrosion of even high grade stainless steel reaction vessels may occur due to the high concentration of chlorides in the waste. Chlorides, sulfates, phosphate, carbonates as well as calcium and other ions which are substantially removed by the method of the present invention, form insoluble compounds which may produce scale on the metal walls of the reaction apparatus or cause crevice and stress corrosion, resulting in cracking, spalling and ultimately catastrophic failure of the reaction apparatus. By removing these corrosive and scale-producing components from the waste before wet oxidation, less expensive metals may be used to construct wet oxidation reaction apparatus 58 and less frequent cleaning of the walls of reaction apparatus 58 is needed. Corrosion is further reduced in the present invention by using a low chloride feed diluent which is preferably derived internally in the manner described. As stated, calcium and other metals forming insoluble carbonates may also be removed by treating the effluent 22 with effluent gas. This decreases scaling even further.

The method of wet oxidation and the preferred wet oxidation apparatus 58 used in the present invention uses the principles disclosed in U.S. Pat. No. 4,272,383 to McGrew which is assigned to the assignee of the present invention and which is incorporated herein by reference. The wet oxidation reaction apparatus disclosed therein includes an assembly of vertically disposed concentric tubes nested to form an influent waste passage and an effluent waste annulus. The reaction vessel extends vertically approximately one mile below ground and is generally known as a down-hole wet oxidation reaction system. Diluted liquid waste 56 is flowed into the influent passage as an influent waste stream. Diluted liquid waste 56 is heated by a counter current heat exchanger as it flows into the wet oxidation reaction apparatus 58, and a source of oxygen 60, such as air or an oxygen-rich gas, or pure oxygen, is mixed therewith so that the flow inside reaction apparatus 58 provides good contacting and mixing between liquid waste 56 and oxygen 60. In the most preferred embodiment of the present invention, liquid waste stream 56 is heated using waste heat recovered in the energy recovery unit including biogas 38 derived from the biological polishing unit 36 as fuel. The oxygenated liquid waste forms a hydrostatic column of considerable fluid pressure in the influent waste passage where the exothermic wet oxidation reaction continues, generating substantial heat. Between 1,000 and 6,000 feet below ground surface, a reaction zone is established where the temperature of the liquid waste reaches approximately 530°–550° F., producing a self-sustaining, greatly accelerated wet oxidation reaction. Boiling of the material at this high temperature is inhibited by the hydrostatic fluid pressure of the column.

Although in our preferred method diluted waste 56 is treated by wet oxidation to oxidize the combustible waste components, the wet oxidation step of the present invention may be replaced with some type of anoxic thermal conditioning process and may include hydrolysis or the like. As set forth in the aforementioned McGrew patent, substantial heat can be recovered from the wet oxidation reaction of the preferred method of the present invention which can be advantageously used to heat the liquid influent waste stream.

Next, the effluent 62 from the wet oxidation reaction apparatus 58 is flowed to ash solids/liquid separation equipment 64 to further concentrate the ash solids. This solids/liquid separation step preferably includes clarification, thickening, by a plate separator and then dewatering to form sterile ash 22 and liquid stream 66. A gravity settler or dissolved air flotation unit could be used in lieu of the plate separator. As stated, at least a portion of the resulting sterile ash 22 is used as a body feed or weighting agent to promote sedimentation of the raw waste 20. In addition to its ability to promote settling of raw waste 20 during the initial dewatering step 26, any COD remaining in ash 22 is further reduced in its second trip through the wet oxidation apparatus 58. Liquid stream 66 is flowed to the biological polishing unit 36 for further treatment in the described manner. It may be suitable and necessary in some instances to first strip liquid effluent stream 66 of ammonia. However, as stated, the concentration of ammonia is very low at this stage due to the initial dewatering step of the present invention. Of course, as stated, this initial dewatering step substantially reduces the amount of ammonia which passes through the wet oxidation reaction apparatus, thus reducing the production of undesired nitrogen-containing effluent products such as pyridenes and other nitrogen-containing organic compounds.

It is to be understood that in its broadest scope, the present invention comprehends separating a substantially untreated waste to form a liquid portion and a solid portion using an internally-derived ash as a weighting agent as previously described. It is preferred that the liquid portion so isolated then be processed by the preferred method of the present invention.

Figure 3:
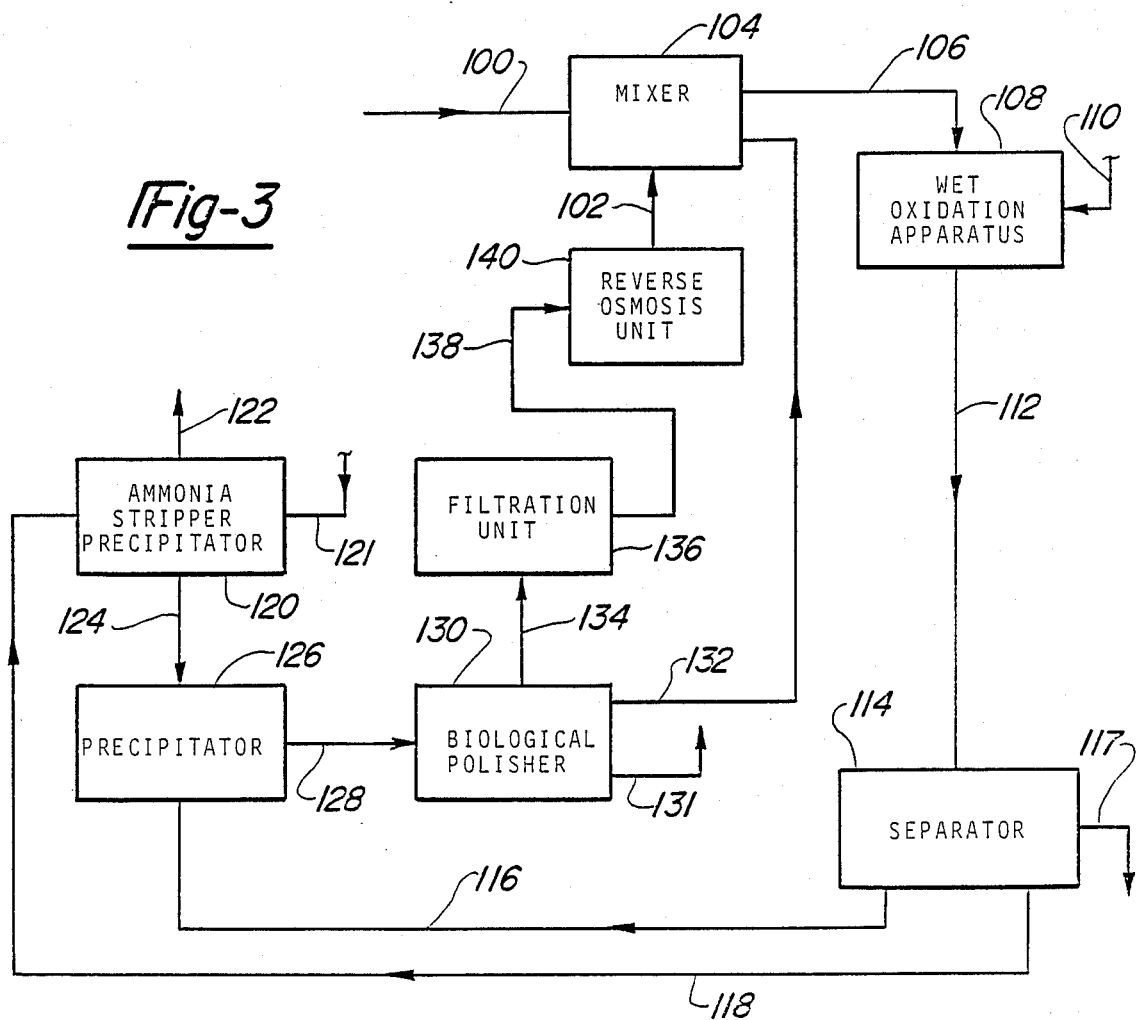
FIG. 3 is a block diagram of an alternative embodiment of the present invention.

Referring now to FIG. 3 of the drawings, in another embodiment of the present invention, raw substantially unprocessed waste 100 is diluted preferably with an internally-derived diluent 102 which has been substantially desalinated. It may be possible to use a desalinated externally derived diluent alone or in combination with internally-derived diluent 102. Waste 100 is diluted with diluent 102 in mixer 104, and the resulting diluted waste 106 is flowed directly to wet oxidation apparatus 108 where it is combined with gaseous oxygen or an oxygen-rich gas 110. Diluted waste 106 preferably is diluted such that solids are present in a concentration of about 5% by weight. In wet oxidation reaction apparatus 108, combustible waste present in diluted waste 106 is substantially oxidized. Again, the preferred method and apparatus for carrying out the wet oxidation reaction uses the principles disclosed in the McGrew patent, which was previously described. The reaction products or effluent 112, produced during the wet oxidation reaction, are then flowed to separation equipment 114 where effluent 112 is degassed when the liquid portion is separated from the solids. The off gases 116 include carbon dioxide. Solids portion 117 comprises a low-volume sterile ash. The liquid effluent portion 118 is then preferably further processed beginning with the removal of ammonia and certain anions including phosphate, sulfate, carbonate and oxalate ions. A part of liquid portion 118 may also be flowed directly back to mixer 104 to be used in diluting waste 100. It is preferred, however, that the liquid portion 118 receive further treatment in the manner to be described.

Liquid portion 118 is flowed into ammonia stripper/precipitator 120 where it is combined with precipitants such as calcium carbonate 121. As previously described, the addition of calcium carbonate is controlled such that phosphate, sulfate, carbonate and oxalate ions are precipitated out of solution and the pH of liquid portion 118 is sufficiently raised such that ammonia is driven off as a vapor to be condensed for use as a fertilizer 122. A liquid stream 124 is thus produced which has a substantially reduced ammonia content and from which the foregoing anions have been substantially removed. Sufficient nitrogen compounds are left, however, in liquid stream 124 to facilitate subsequent biological polishing.

Liquid stream 124 is then flowed into precipitator 126 where it is mixed with carbon dioxide from the off gases 116 derived during the degassing of the wet oxidation effluent 112. Any potential scale-forming ions remaining in liquid stream 124, such as calcium and magnesium ions, are thereby carbonated. The resulting de-ammoniated, deionized stream 128 is then flowed into biological polishing unit 130 where anaerobic microbes decompose much of the dissolved and suspended organic matter. Biological polishing 130 may include a sequence of anaerobic polishing followed by aerobic polishing if desired in a particular application. Biogas 131 is evolved as a byproduct of the biological polishing process and includes methane and carbon dioxide. It may be appropriate, as in the previously described embodiment, to use biogas 131 to carbonate liquid stream 124 to remove magnesium and calcium ions. By stripping out the carbon dioxide in this manner, the fuel value of biogas 131 is increased due to the resultant increase in the percentage of methane. Sludge or biomass 132, which is also generated during the biological polishing step, is combined with the diluted waste in mixer 104 to be oxidized in wet oxidation apparatus 108.

Liquid stream 134, resulting after biological polishing 130, has a substantially reduced COD. Preferably, liquid stream 134 receives further processing by filtration unit 136, which is preferably an ultrafiltration system. The filtered stream 138 is then treated by reverse osmosis treatment 140, which produces diluent liquid stream 102 that is substantially free of chlorides, magnesium, calcium, phosphate, sulfate, carbonate and oxalate. The removal of chlorides, magnesium, and calcium are particularly significant due to their tendency to corrode metal surfaces as previously indicated. The deionized or demineralized liquid stream 102 is then preferably used as a diluent for water 100 as described. As in the previous embodiment, filtration 136 and reverse osmosis 140 may be replaced by evaporation means (not shown). Of course, rather than using liquid stream 102 as a diluent, it may be simply discharged into receiving waters.

Having described the preferred method of the present invention, it is to be understood that various modifications may be made to the invention disclosed herein within the purview of the appended claims.

What is claimed is:

1. A method of treating organic waste having a liquid component and a solid component, comprising the steps of:
   weighting the organic waste with ash to accelerate sedimentation of said weighted organic waste;
   separating the weighted organic waste to isolate said liquid component from said solid component;
   chemically reacting said solid component to substantially lower the oxygen demand of said solid component and to produce a liquid effluent and an ash, a portion of said ash being used in said weighting step to weight said organic waste;
   de-ammoniating said liquid component to form a de-ammoniated liquid stream;
   combining said liquid effluent with said de-ammoniated liquid stream to form a combined liquid stream; and,
   contacting said combined liquid stream with biologically active microbes to lower the oxygen demand of said combined liquid stream.

2. The method for treating organic waste recited in claim 1, wherein said separating step includes allowing said weighted organic waste to settle in response to gravity to separate said liquid component from said solid component.

3. The method for treating organic waste recited in claim 1, wherein said chemically reacting step includes diluting said solid component with substantially deionized water, adding oxygen to said diluted solid component, and elevating the temperature of said diluted solid component to produce a wet oxidation reaction.

4. The method for treating organic waste recited in claim 3, wherein said chemically reacting step is carried out in a vertical, down-hole wet oxidation reaction apparatus.

5. The method for treating organic waste recited in claim 1, wherein said de-ammoniating step includes ammonia stripping.

6. The method for treating organic waste recited in claim 1, wherein said biologically active microbes include anaerobic microorganisms which convert organic waste to methane, carbon dioxide and other compounds.

7. The method for treating organic waste recited in claim 1, wherein said chemically reacting step includes anoxic thermal conditioning of said solid component.

8. A method for continuous processing of organic waste having a liquid component and a solid component, comprising the steps of:
   adding ash to said organic waste, said ash serving to weight said organic waste;
   separating said weighted organic waste to isolate said liquid component from said solid component;
   oxidizing said solid component of said organic waste in an accelerated wet oxidation reaction to lower the oxygen demand of said solid component and to form a liquid effluent and an ash, said ash being used in said ash-adding step;
   de-ammoniating said liquid component to form a de-ammoniated liquid stream;
   adding said liquid effluent to said de-ammoniated liquid stream to form a combined liquid stream; and
   contacting said combined liquid stream with biologically active microbes to reduce the oxygen demand of said combined liquid stream and to form a low oxygen demand stream.

9. The method for treating organic waste recited in claim 8, further including the step of filtering said low oxygen demand stream to remove substantially all suspended organic matter and substantially all salts to form a deionized stream.

10. The method for treating organic waste recited in claim 9, wherein said oxidizing step includes diluting said solid portion with said deionized stream to form a liquid influent, flowing said liquid influent into a vertical, subterranean wet oxidation reaction apparatus, adding oxygen to said liquid influent, raising the temperature of said liquid influent to produce an accelerated wet oxidation reaction, whereby said solid portion of said organic waste is substantially oxidized.

11. The method for treating organic waste recited in claim 9, wherein said step of filtering said low oxygen demand stream includes ultrafiltration followed by reverse osmosis.

12. A process for treating organic waste having an oxygen demand, comprising the steps of:
   weighting said organic waste with an internally-derived ash, said weighting step including combining said organic waste with said internally-derived ash to form a weighted organic waste and mixing said weighted organic waste to substantially, evenly distribute said internally-derived ash in said organic waste;
   separating said weighted organic waste into a solid component and a liquid component, said liquid component having at least a portion of said oxygen demand of said organic waste;
   oxidizing said solid component in a wet oxidation reaction in a vertical, down-hole wet oxidation reaction apparatus to form said internally-derived ash for use in said weighting step and to form a liquid effluent;
   de-ammoniating said liquid component to form a de-ammoniated liquid stream;
   combining said de-ammoniated liquid stream with said liquid effluent to form a combined stream;
   contacting said combined stream with biologically active microbes to reduce the oxygen demand of said combined stream and to produce a low oxygen demand stream; and filtering said low oxygen demand stream to form a deionized stream.

13. The process for treating organic waste recited in claim 12, wherein said oxidizing step includes diluting said solid component with said deionized stream.

14. The process for treating organic waste recited in claim 12, wherein said de-ammoniating step includes ammonia stripping.

15. A method for processing waste containing organic matter which includes the wet oxidization of said waste to produce an ash having a first COD level, said method comprising the steps of:

combining said ash with said waste to form an ash-weighted waste;

separating said ash-weighted waste into a liquid portion and a solid portion; and oxidizing said solid portion in a wet oxidization reaction such that said first COD level of said ash is reduced to a second COD level.

16. A method for treating waste containing organic matter comprising the steps of:

diluting said waste with a substantially de-ammoniated, deionized diluent;

chemically reacting said diluted waste in a wet oxidization reaction apparatus to substantially lower the oxygen demand of said waste and to produce a liquid effluent, an ash, and a mixture of gases;

separating said liquid effluent, said ash and said gas mixture;

de-ammoniating said liquid effluent to form a de-ammoniated liquid stream;

contacting said de-ammoniated liquid stream with biologically active microbes to lower the oxygen demand of said liquid stream; and treating said liquid stream after said microbe contacting step by ultrafiltration followed by reverse osmosis to produce said de-ammoniated, deionized diluent.

17. The method for treating waste containing organic matter as recited in claim 16, further including the step of removing anions from said liquid effluent during said de-ammoniating step.

18. The method for treating waste containing organic matter as recited in claim 17, further including removing cations from said de-ammoniated liquid stream by combining said de-ammoniated liquid stream with carbon dioxide.

19. The method for treating waste containing organic matter as recited in claim 18, wherein said carbon dioxide is derived from said gas mixture.

* * * * *